US005438756A

United States Patent [19]

Halchak et al.

[11] Patent Number: 5,438,756

[45] Date of Patent: Aug. 8, 1995

[54] METHOD FOR ASSEMBLING A TURBINE FRAME ASSEMBLY

[75] Inventors: Kenneth L. Halchak, Wilmington, N.C.; Daniel C. Schwarz, Hamilton; Martin L. Birmingham, West Chester, both of Ohio

[73] Assignee: General Electric Company, Cincinnati, Ohio

[21] Appl. No.: 169,443

[22] Filed: Dec. 17, 1993

[51] Int. Cl.[6] .......... B23P 15/00

[52] U.S. Cl. .......... 29/889.2; 29/889.22

[58] Field of Search .......... 29/889.2, 889.22, 889.21, 29/428; 415/209.3, 142, 209.4

[56] References Cited

U.S. PATENT DOCUMENTS

| | | | |
|---|---|---|---|
| 2,771,622 | 11/1956 | Thorp, II . | |
| 3,836,282 | 9/1974 | Mandelbaum et al. | 415/217 |
| 4,249,859 | 2/1981 | Benyi, Jr. et al. | 415/79 |
| 4,832,568 | 5/1989 | Roth et al. | 415/189 |
| 5,180,282 | 1/1993 | Lenhart et al. | 415/209.2 |
| 5,236,303 | 8/1993 | Fowler et al. | 415/190 |
| 5,267,397 | 12/1993 | Wilcox | 29/889.2 |
| 5,292,227 | 3/1994 | Czachor et al. | 415/209.3 |

*Primary Examiner*—Irene Cuda
*Attorney, Agent, or Firm*—Jerome C. Squillaro; David L. Narciso

[57] ABSTRACT

A method of assembling a turbine frame assembly for use in a gas turbine engine includes the step of disposing the outer casing in a generally concentric relationship with an annular inner hub and a plurality of circumferentially spaced apart and radially extending struts attached to the hub. The method further includes inserting at least one cam alignment tool through one of a plurality of casing mount holes and into a corresponding one of a plurality of clevis base mount holes, with the clevis being attached to an outer end of a first one of the struts. The cam alignment tool is rotated to cam the strut relative to the casing to align the casing mount holes with the clevis mount holes. The clevis base is then fastened to the outer casing and the cam alignment tool is removed.

8 Claims, 5 Drawing Sheets

METHOD FOR ASSEMBLING A TURBINE FRAME ASSEMBLY

BACKGROUND OF THE INVENTION

1. Field of the Invention

The present invention relates generally to gas turbine engines and, more particularly, to a method for assembling a turbine frame assembly of a gas turbine engine.

2. Related Art

Conventional high bypass ratio turbofan engines, which are included in the more general category of gas turbine engines and which may be used for aircraft propulsion, typically include a fan, booster, high pressure compressor, combustor, high pressure turbine and low pressure turbine in serial axial flow relationship about a longitudinal centerline axis of the engine. The high pressure turbine is drivingly connected to the high pressure compressor via a first rotor shaft, with the rotatable portions of the combination of components comprising a high pressure rotor module. The low pressure turbine is drivingly connected to both the fan and booster via a second rotor shaft, with the rotatable portions of the combination comprising the low pressure rotor module. The high and low pressure rotor modules am supported by bearings which, in turn, are supported by structural frame components such as the turbine center frame assembly which is positioned between the low and high pressure turbines.

Structural frame components typically include an annular inner hub, an annular outer casing and a plurality of circumferentially spaced and radially extending hollow struts which extend between and are fixedly connected to the inner hub and outer casing. The outer casing, struts and inner hub may be made of an integral casting or, in other known frame assemblies, the inner hub and radially extending struts may be made of an integral casting with the struts bolted to the outer casing.

Structural frame components which am disposed downstream of the core engine, such as the turbine center frame assembly, are exposed to the hot combustion gases of the primary or core engine gas stream which are produced when the pressurized air exiting the high pressure compressor enters the combustor and is mixed with fuel and burned to provide a high energy gas stream. The high energy gas stream then expands through the high pressure turbine prior to engaging the turbine center frame assembly. Since the struts of such frame assemblies must pass through the combustion gases they must be suitably protected from the high temperature gas stream. Accordingly, each of the struts are typically encased by air-cooled aerodynamically-shaped fairings.

Structural frame assemblies must have suitable structural rigidity for supporting the rotor shafts of the gas turbine engine so as to maintain rotor to stator concentricity and the associated clearances within acceptable limits. Known examples of structural frame assemblies used in earlier gas turbine engines are configured so that the radially extending struts penetrate the outer annular casing. However, this penetration is known to decrease the effective rigidity of the structural frame assemblies. Consequently, known examples of structural frame assemblies used in more modem gas turbine engines, such as that disclosed in U.S. Pat. No. 5,292,227, filed Dec. 10, 1992, entitled "TURBINE FRAME", which is assigned to the assignee of the present invention and which is herein expressly incorporated by reference. U.S. Pat. No. 5,292,227 discloses a turbine frame assembly 32 which includes a first structural ring 36 or outer annular casing, a second structural ring 38, or inner hub, and a plurality of circumferentially spaced apart hollow struts 40 extending radially between the outer casing and inner hub 36 and 38, respectively. In the exemplary embodiment illustrated in FIG. 1 of U.S. Pat. No. 5,292,227, the inner ends 40*b* of the struts 40 are integrally formed with the hub 38 in a common casting, for example, and the outer ends 40*a* of the struts 40 are removably fixedly joined to the casing 36 using clevises 52, with each clevis 52 including an arcuate base 54 disposed against the tuner circumference of the casing 36. Clevises 52 further include a plurality of mounting holes 56, with eight being shown for example, for receiving a respective plurality of mounting bolts 58, with corresponding nuts, therethrough to removably fixedly join the base 54 to the casing 36. U.S. Pat. No. 5,292,227 further discloses that for increased rigidity of the turbine frame assembly 32, and to insure repeatability of reassembly, the clevis 52 and strut end 40*a* may be ground to establish an interference fit to the casing 36. The interference fit and the inaccessibility of struts 40 from inside the casing due to fairings 42 which surround respective ones of the struts 40, create difficulty in aligning casing 36 relative to struts 40 which is required to install mounting bolts in line-drilled holes 56 extending through casing 36 and clevises 52. This alignment is exacerbated, as may be appreciated by one of ordinary skill in the art, due to the frusto-conical shape of casing 36.

In view of the foregoing, prior to the present invention, a need existed for a method of aligning an outer casing of a turbine frame assembly such as that disclosed in U.S. Pat. No. 5,292,227.

SUMMARY OF THE INVENTION

The present invention is directed to a method of aligning an annular outer casing of a turbine frame assembly for use in a gas turbine engine. According to a preferred embodiment of the present invention, the method comprises disposing the outer casing in a generally concentric relationship with an annular inner hub and a plurality of circumferentially spaced apart and radially extending struts attached to the hub. The method further comprises inserting at least one cam alignment tool through one of a plurality of mount holes in the outer casing and into a corresponding one of a plurality of mount holes in a base of a clevis attached to an outer end of a first one of the struts. The method still further comprises the following steps: rotating the cam alignment tool to cam the first one of the struts relative to the casing to align the plurality of casing mount holes with the plurality of clevis base mount holes; fastening the clevis base to the outer casing; and removing the cam alignment tool.

In accordance with another preferred embodiment of the present invention, the step of inserting comprises the steps of: disposing a pair of cam alignment tools in diametrically opposed ones of the casing mount holes and the clevis base mount holes; positioning a shank portion of each of the tools in one of the diametrically opposed casing mount holes; and locating a cam portion of each of the tools in one of the diametrically opposed clevis base mount holes. The step of rotating is applied to at least one of the cam alignment tools and the step of removing is applied to the pair of cam alignment tools. The foregoing method steps are then repeated, in order, for the following struts: a second one of the struts which is diametrically opposed from the first strut; a third one of the struts which is circumferentially disposed between the first and second struts; a fourth one of the struts which is diametrically opposed from the third strut; and the remaining ones of the struts.

BRIEF DESCRIPTION OF THE DRAWINGS

The method steps of the present invention, as well as the advantages derived therefrom, will become apparent from the subsequent detailed description of the preferred embodiments when taken in conjunction with the accompanying drawings in which.

DETAILED DESCRIPTION

Figure 1:
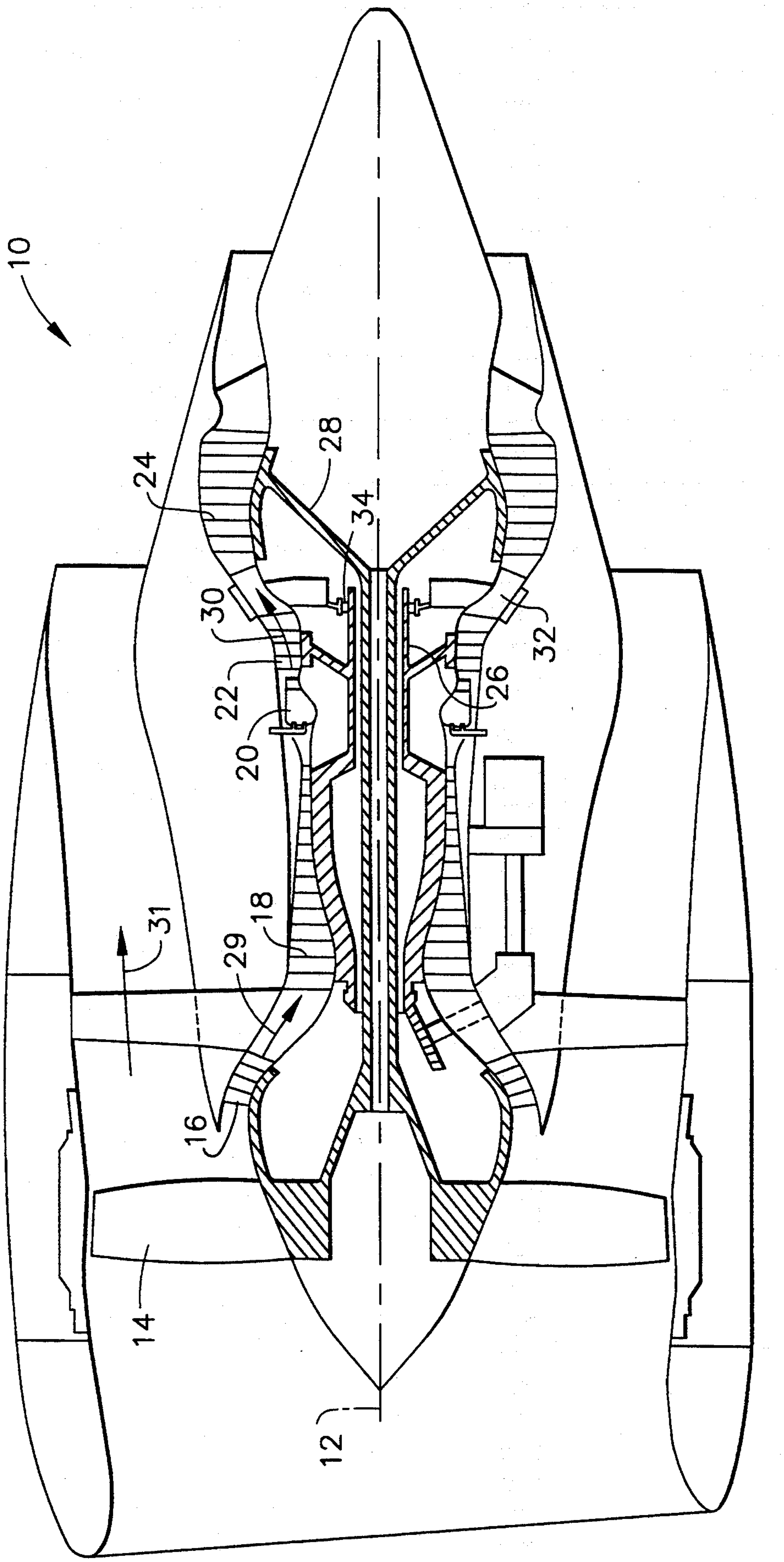
FIG. 1 is a longitudinal cross-section, illustrating an exemplary gas turbine engine incorporating a turbine center frame which has an outer casing aligned by the present invention.

Referring now to the drawings, wherein like reference numerals have been used for similar elements throughout, FIG. 1 illustrates a longitudinal cross-section of an exemplary gas turbine engine 10. The engine 10 includes, in serial axial flow communication about an axially extending longitudinal centerline axis 12, conventional components including a fan 14, booster 16, high pressure compressor 18, combustor 20, high pressure turbine 22 and low pressure turbine 24. High pressure turbine 22 is drivingly connected to the high pressure compressor 18 with a first rotor shaft 26 and low pressure turbine 24 is drivingly connected to both the booster 16 and fan 14 with a second rotor shaft 28.

During operation of engine 10 ambient air enters the engine inlet and a first portion, commonly denoted the primary or core gas stream 29, passes through the fan 14, booster 16, and high pressure compressor 18, being pressurized by each component in succession. The primary gas stream then enters the combustor 20 where the pressurized air is mixed with fuel to provide a high energy gas stream 30. The high energy gas stream 30 then enters in succession the high pressure turbine 22 where it is expanded, with energy extracted to drive the high pressure compressor 18, and low pressure turbine 24 where it is further expanded, with energy being extracted to drive the fan 14 and booster 16. A second portion of the ambient air entering the engine inlet, commonly denoted the secondary or bypass air flow 31, passes through the fan 14 before exiting the engine 10 through an outer annular duct, which is formed between a nacelle assembly and core cowl, wherein the secondary airflow 31 provides a significant portion of the engine thrust.

Figure 2:
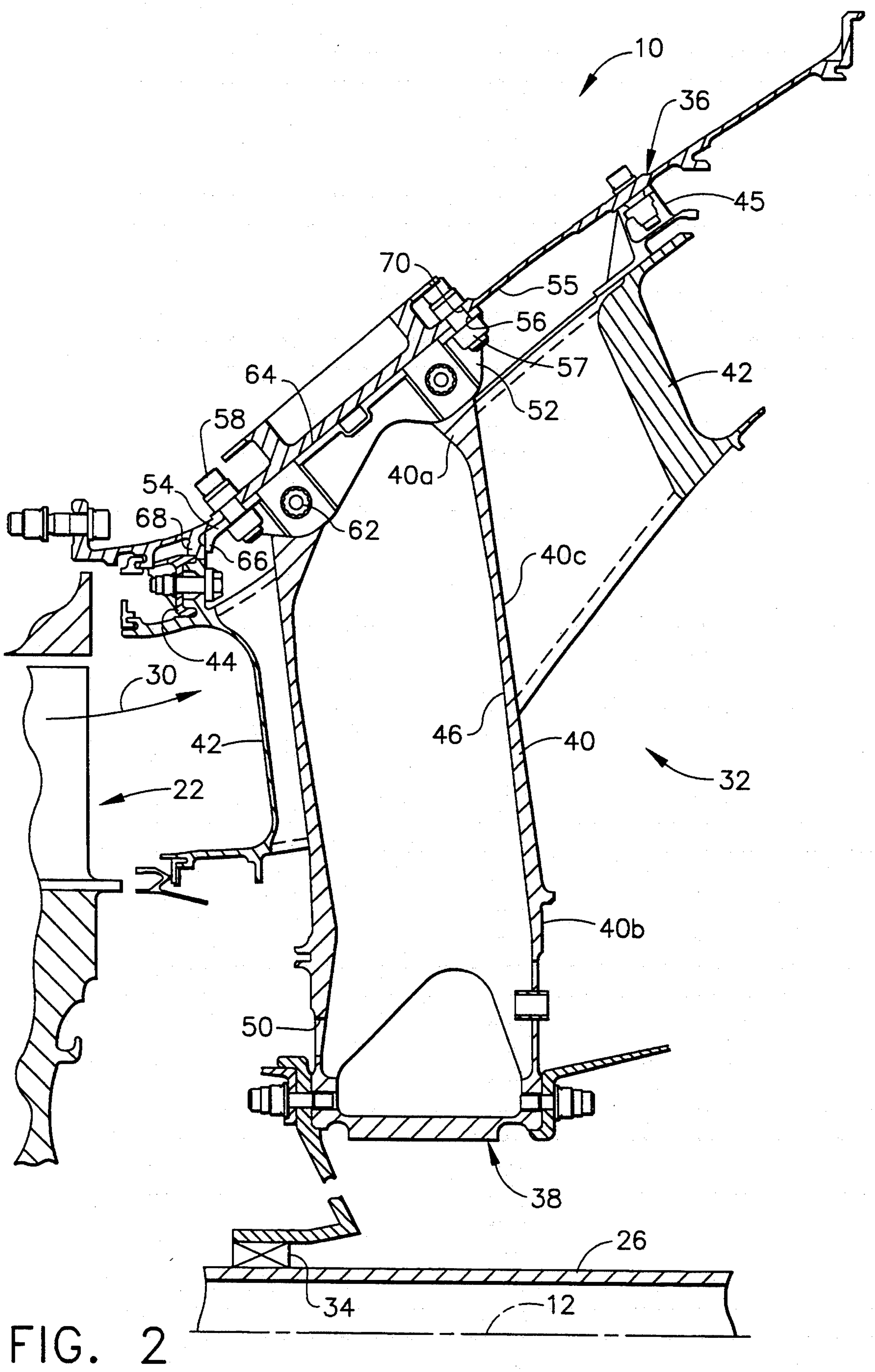
FIG. 2 is an enlarged longitudinal cross-section of the turbine center frame assembly shown in FIG. 1.

As shown in FIG. 1 engine 10 includes an annular turbine center frame assembly 32 which is positioned between high pressure turbine 22 and low pressure turbine 24. Turbine center frame assembly 32, which is illustrated in more detail in FIG. 2, is provided for supporting a conventional bearing 34 which in turn supports one end of the first rotor shaft 26 for allowing rotation of shaft 26. Since turbine center frame assembly 32 is disposed downstream of high pressure turbine 22, it must be protected from the high energy gas stream, or combustion gases 30 which flow therethrough.

Turbine center frame assembly 32 includes an annular outer casing 36, or first structural ring, disposed coaxially about the centerline axis 12. Assembly 32 also includes an annular inner hub, or second structural ring 38, disposed coaxially with the outer casing 36 about the centerline axis 12 and spaced radially inwardly from casing 36. A plurality of circumferentially spaced apart hollow struts 40 extend radially between outer casing 36 and inner hub 38 and are fixedly joined to casing 36 and hub 38.

Frame assembly 32 also includes a plurality of conventional fairings 42 each of which conventionally surrounds a respective one of the struts 40 for protecting the struts 40 from the high energy combustion gases 30 which flow through assembly 32 between struts 40. Fairings 42 are fixedly attached to outer casing 36 with forward and aft mount brackets 44 and 45, respectively. A plurality of outer panels (not shown) and a plurality of inner panels (also not shown) are attached to and interconnect outer and inner ends, respectively, of the fairings 42 so as to form an annular flowpath for directing combustion gases 30 through turbine frame assembly 32 between struts 40.

Each of the struts 40 includes a first, or outer, end **40*a* and a radially opposite second, or inner, end 40*b* with an elongate center portion 40*c* extending therebetween. As shown in FIG. 2, the strut 40 is hollow and includes a through channel 46 extending completely through the strut 40 from the outer end 40*a* and through the center portion 40*c* to the inner end 40*b*. Outer casing 36 includes a plurality of circumferentially spaced apart ports (not shown) extending radially therethrough, and the hub 38 also includes a plurality of circumferentially spaced apart through ports 50. The casing ports, strut channel 46 and hub ports 50 are in flow communication with one another for directing cooling air (not shown) through struts 40**.

The inner ends **40*b* of the struts 40 are integrally formed with the hub 38 in a common casting and the outer ends 40*a* of the struts 40** are removably fastened to outer casing 36. Turbine frame assembly 32 includes a plurality of devises 52 which removably join the strut outer ends 40a to outer casing 36. Each of the clevises 52 is disposed between a respective one of the strut ends 40a and casing 36, in alignment with respective ones of the casing ports for removably joining the strum 40 to the casing 36, for both carrying loads and providing access therethrough.

Each of the clevises 52 includes an arcuate base 54 disposed against the radially inner surface 55 of casing 36. Base 54 includes a plurality of mounting holes 56 and a corresponding plurality of nut plates 57 attached to an inner surface of base 54, for receiving a respective plurality of mounting bolts 58 therethrough to removably fasten the clevis base 54 to casing 36. Base 54 also includes a central aperture: (not shown) which is aligned with a respective one of me casing ports.

The clevis 52 also includes first and second legs (not shown) extending radially inwardly away from the base 54 and being preferably integral then:with, with the legs being spaced circumferentially apart and joined together at their ends to define a generally axially extending U-shaped clevis slot, or pocket, which receives the strut outer end 40a. The first and second clevis legs and the strut outer end 40a have a pair of generally axially spaced apart line-drilled bores (not shown) extending therethrough which receive a respective pair of conventional expansion bolts 62 for removably fixedly joining the strut outer end 40a to the clevis legs, with the strut through channel 46 being disposed generally axially between the two expansion bolts 62 and aligned with both the base aperture and casing port. The strut outer end 40a is disposed in the clevis slot in abutting comet with the radially inner surface 55 of casing 36 through the clevis base central aperture for carrying compressive loads directly thereto through the strut 40 during operation of engine 10. The radially outer surface 64 of clevis base 54 is also disposed in abutting comet with the radially inner surface 55 of casing 36. For a further discussion of the addition structural features and functions of turbine frame assembly 32, the reader is referred to commonly assigned U.S. Pat. No. 5,292,227.

The manufacture and assembly of turbine frame assembly 32 includes the following preliminary steps. Strut outer end 40a and the spaced apart legs of clevis 52 are line drilled for receiving expansion bolts 62 for removably fixedly joining strut outer end 40a to clevis 52. The radially outer surface 64 of clevis 52 and the strut ends 40a are then conventionally ground to a suitable are for mating with the radially inner surface 55 of casing 36, which is also machined. Radially outer surface 64 of clevis 52 and strut ends 40a are ground to establish an interference fit with the radially inner surface 55 of casing 36. Casing 36 is then disposed in a generally concentric relationship with struts 40 and hub 38 without fairings 42 being installed in surrounding relationship with struts 40 and without the inner and outer flowpath panels installed between fairings 42. Casing 36 is disposed relative to struts 40 so that an axial stop or tab 66 extending axially forwardly from each base 54 is positioned in abutting relationship with a radially inwardly extending flange 68 of casing 36 for accurately axially aligning all of the devises 52, and in turn the struts 40. Since fairings 42 and the associated inner and outer flowpath panels are not installed the concentric disposition of casing 36 relative to struts 40 may be facilitated using hydraulic clamps (not shown).

Next the casing 36 and each of the devises 52 are line drilled to establish the plurality of mount holes 56 extending through clevis base 54 and to establish a corresponding aligned plurality of mount holes 70 extending through casing 36. Other assembly features, which are not relevant to the present invention, are also machined at this stage of assembly. At this point, casing 36 is separated from the sub-assembly comprising hub 38, struts 40 and clevises 52.

Fairings 42 are then installed in surrounding relationship with struts 40 by sliding fairings 42 radially downwardly over strut outer ends 40a. The inner and outer flowpath panels (not shown) are then interconnected between each of the fairings 42. Next, as preparation for the final assembly steps which include mating casing 36 to clevises 52, dry ice is applied to hub 38 and struts 40 to shrink struts 40 to facilitate the interference fit between the radially outer surface 64 of base 54 of clevis 52 and the radially inner surface 55 of casing 36.

Figure 3:
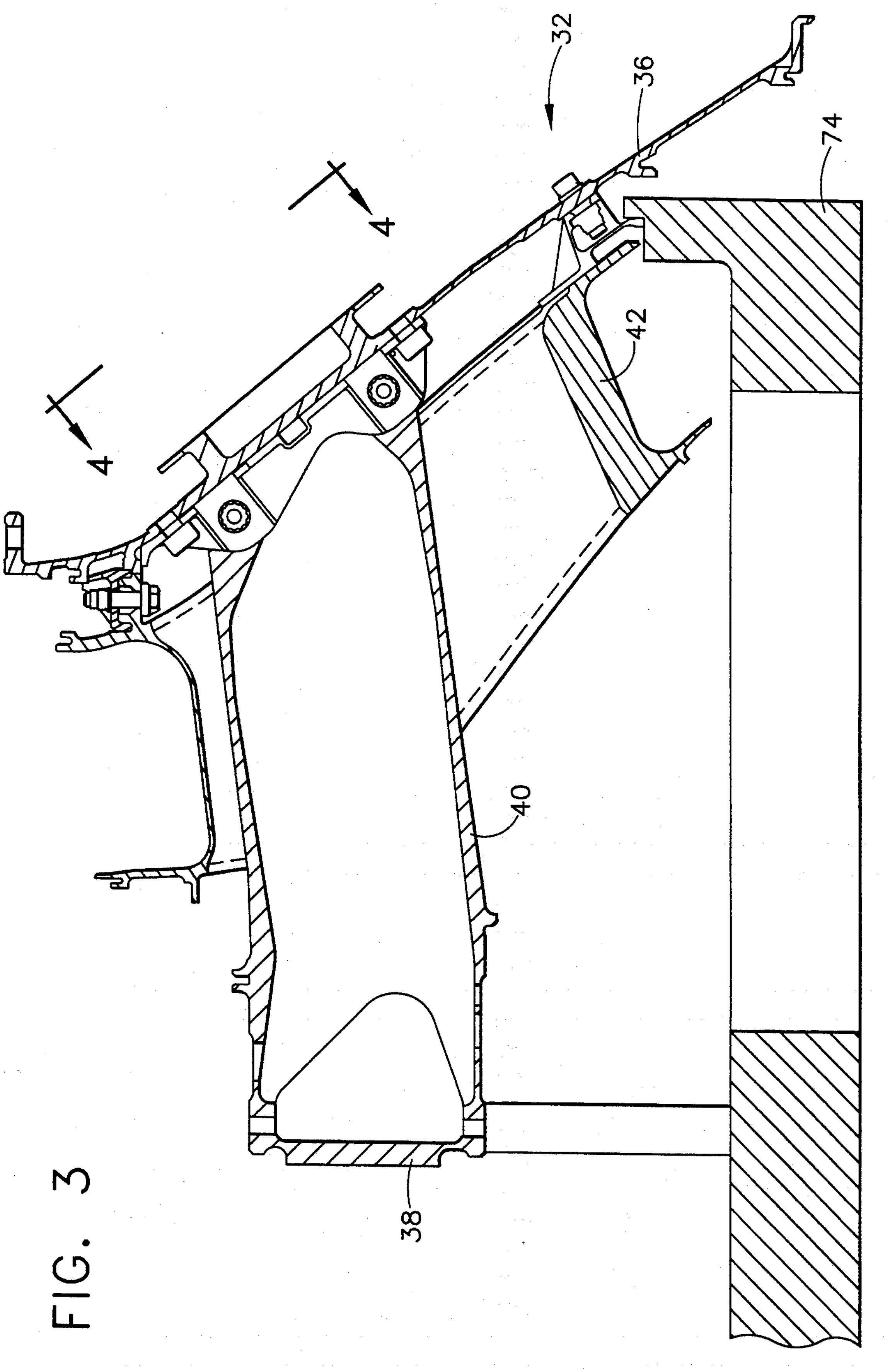
FIG. 3 is a view illustrating the turbine center frame assembly of FIG. 2 mounted to an assembly fixture such that the outer annular casing of the turbine center frame assembly is generally concentrically disposed about the plurality of assembly struts.
Figure 4:
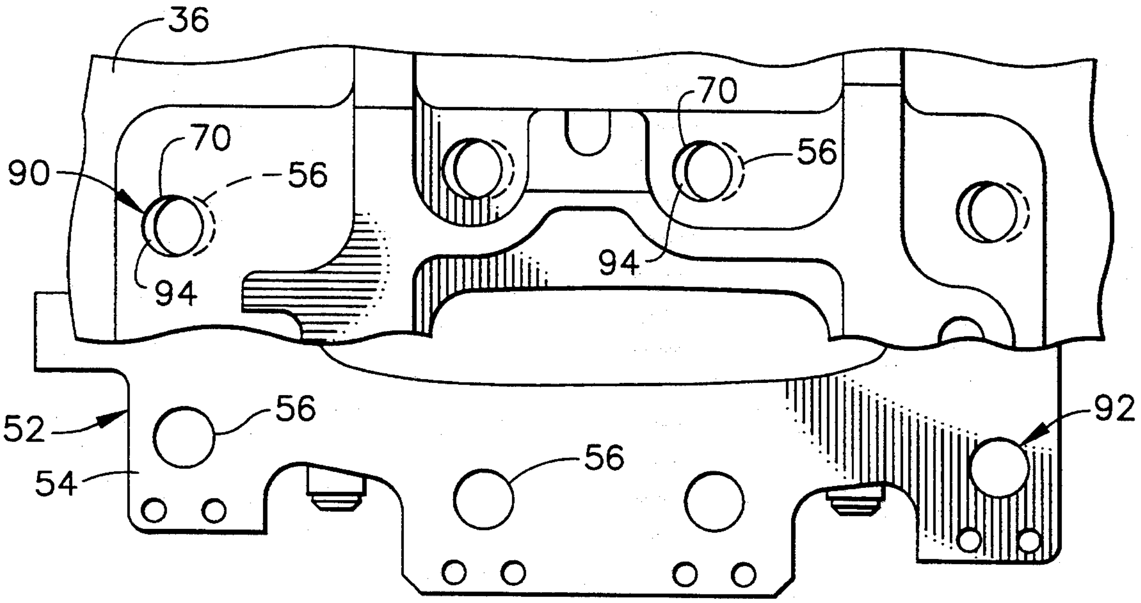
FIG. 4 is a top view of a portion of the turbine center frame assembly illustrated in FIG. 3 and taken along line 4—4, with FIG. 4 being partly cut away to illustrate mount holes in a clevis attached to a strut end.
Figure 9:
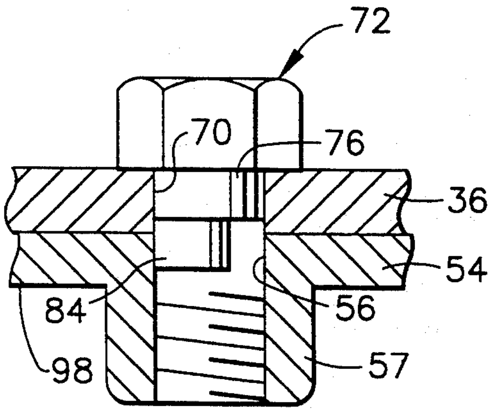
FIG. 9 is a partial cross-sectional view illustrating the cam alignment tool inserted in the casing and clevis holes after the casing and clevis have been aligned.
Figure 10:
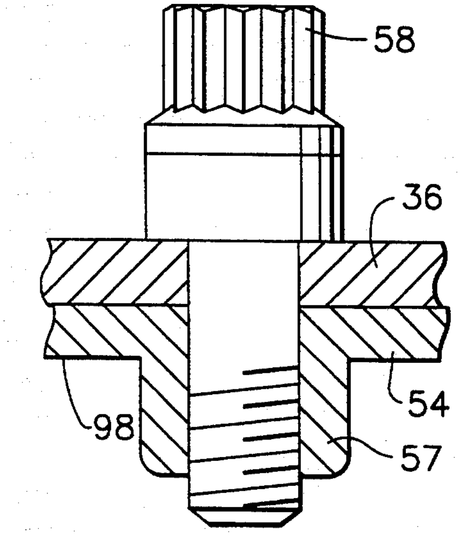
FIG. 10 is a partial cross-sectional view illustrating a mounting bolt inserted through a casing mount hole and a clevis mount hole after the holes have been aligned.
Figure 11:
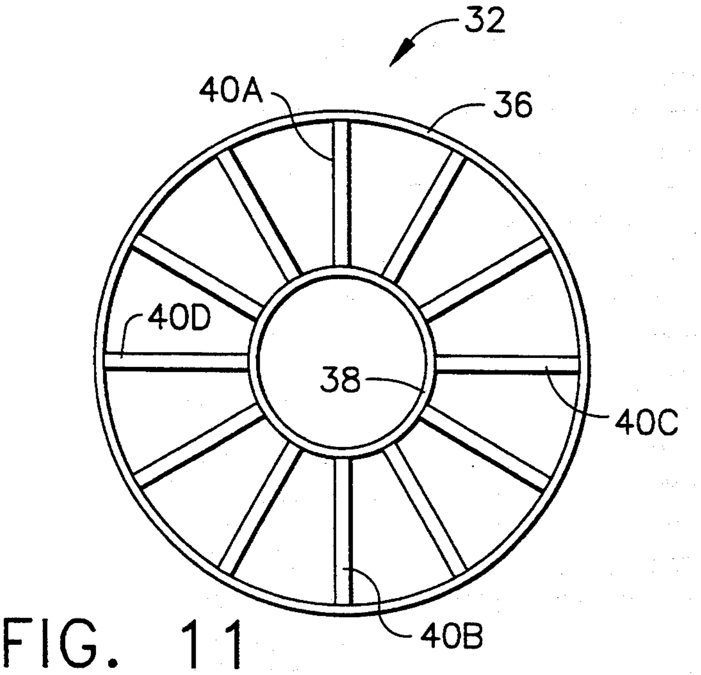
FIG. 11 is a transverse view illustrating the plurality of struts of the turbine center frame assembly.

Referring now to FIGS. 3–11, the method of the present invention and a cam alignment tool 72 of the present invention, are illustrated. The present invention discloses a method of aligning annular outer casing 36 of turbine frame assembly 32 comprising a first step, illustrated in FIG. 3, of disposing the outer casing 36 in a generally concentric relationship with the annular inner hub 38 and the plurality of circumferentially spaced apart and radially extending struts 40 which are attached to hub 38. It is noted that only one of struts 40 are illustrated in FIG. 3. However, the method of the present invention provides for the attachment of the plurality of struts 40 as illustrated in FIG. 11. As shown in FIG. 3, turbine center frame assembly 32 is supported by fixture 74 with outer casing 36 disposed in the generally concentric relationship with inner hub 38 and struts 40. As further shown in FIG. 3, it is noted that fairings 42 are installed in surrounding relationship with struts 40 at this stage of final assembly. Consequently, the hydraulic clamps used during preliminary assembly, when fairings 42 were not installed, cannot be used to facilitate the alignment of casing 36. This fact coupled with the interference fit between strut outer ends 40a and the radially outer surface 66 of clevis base 54 with the radially inner surface 55 of casing 36 results in casing mount holes 70 being misaligned with mount holes 56 in base 54 of clevis 56 as illustrated in FIG. 4. The misalignment between casing mount holes 70 and clevis base mount holes 56 occurs notwithstanding the previously described application of dry ice to the hub 38 and struts 40 since the interference fit of strut ends 40a and clevises 52 to casing 36 prevent the casing 36 from properly seating in an axial direction over clevises 52. The generally frusto-conical shape of casing 36 contributes to the inability of casing 36 to properly seat axially since the generally frusto-conical shape tends to squeeze casing 36 in an axially forward direction, or upward as shown in FIG. 3, away from hub 38. Holes 70 may also be slightly clocked, or misaligned circumferentially, relative to holes 56. Since the hydraulic tools used in preliminary assembly can no longer be used, another means of providing external force for aligning casing 36 must be used and is provided by the cam alignment tools 72 of the present invention.

Figure 5:
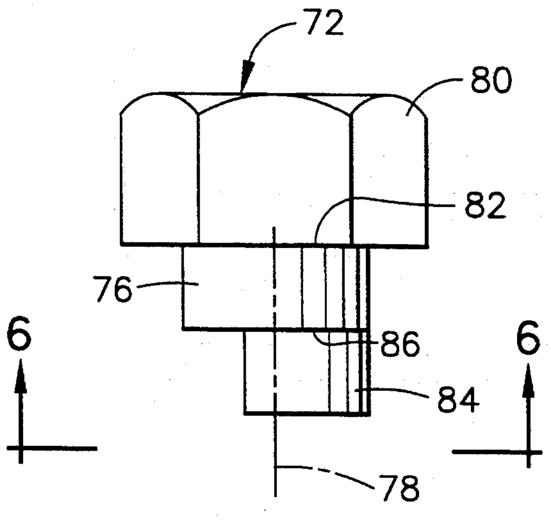
FIG. 5 is a side elevation view illustrating the cam alignment tool of the present invention.
Figure 6:
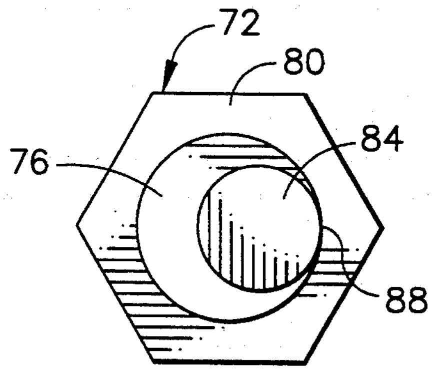
FIG. 6 is an end view illustrating the cam alignment tool of the present invention and taken along line 6—6 in FIG. 5.

Referring now to FIGS. 5 and 6, the cam alignment tool 72 of the present invention is illustrated. Cam alignment tool 72 comprises a shank portion 76 having a centerline 78 and a hexagonal head 80 which is aligned with centerline 78 and is attached to a first end 82 of shank portion 76. Cam alignment tool 72 further comprises a cam portion 84 which is attached to and extends from an opposite end 86 of shank portion 76 in a position eccentric to centerline 78 of shank portion 76. It is important to note that the periphery of cam portion 84 lies within the periphery of shank portion 76 except at location 88 where the periphery of cam portion 84 is locally coincident with the periphery of shank portion 76. If this were not the case, cam alignment tool 72 would not be effective for completely aligning casing mount holes 70 with clevis base mount holes 56.

Figure 7:
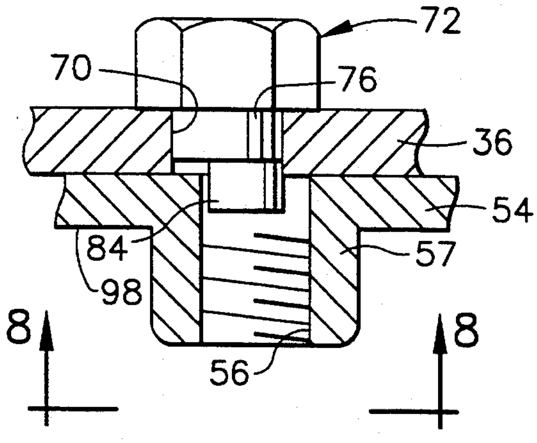
FIG. 7 is a partial cross-sectional view illustrating the cam alignment tool of the present invention inserted through misaligned holes in the turbine center frame outer casing and the clevis mount holes.

The method of the present invention further comprises the step of inserting at least one cam alignment tool 72 through a mount hole 70 in outer casing 36 and into a corresponding hole 56 in base 54 of clevis 52 which is attached to outer end 40*a* of a first one of the struts 40. Although the method of the present invention may be achieved by inserting a single cam alignment tool 72 through a hole 70 and into a corresponding hole 56, in a preferred embodiment a pair of cam alignment tools 72 are disposed in diametrically opposed ones of the casing mount holes 70 and the clevis base mount holes 56, which are generally designated as locations 90 and 92 in Figure 4. FIG. 4 is shown in cutaway view with the top half of FIG. 4 illustrating the exterior surface of outer casing 36 and further illustrating the misalignment between casing holes 70 and clevis base holes 56, with the misalignment being shown as crescent shaped portions 94 of clevis base 54 which may been seen through the upper four casing holes 70. The bottom half of FIG. 4 illustrates holes 56 in base 54 of clevis 52. In a preferred embodiment, eight pairs of holes 70 and 56 are used to attach each clevis base 54, which consequently attaches each strut 40, to outer casing 36 as illustrated in FIG. 4. However, it should be understood that other numbers of mount holes may be used and furthermore it should be understood that the hole pattern shown in FIG. 4 is repeated around the circumference of casing 36 at a plurality of locations corresponding to the number of struts 40, which is 12 in a preferred embodiment as illustrated in FIG. 11. It should be further understood that the method of the present invention may be advantageously utilized in turbine frame assemblies which include other quantifies of struts 40. FIG. 7 illustrates one of the cam tools 72 being inserted through one of the casing mount holes 70 and into a corresponding one of the clevis base mount holes 56. As shown in FIG. 7 the step of inserting the cam alignment tools 72 through casing mount holes 70 and into clevis base mount holes 56 further comprises the steps of positioning the shank portion 76 of each cam alignment tool 72 in one of the casing mount holes 70 and locating the cam portion 84 of each tool 72 in one of the clevis mount holes 56.

Figure 8:
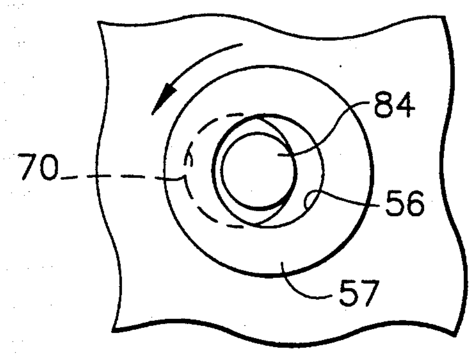
FIG. 8 is a bottom view illustrating the end of the cam alignment tool and the misaligned casing and clevis holes taken along line 8—8 in FIG. 7.

The method of the present invention further comprises the step of rotating at least one of the cam alignment tools 72 which are positioned at locations 90 and 92 as shown in FIG. 4 to cam one of the struts 40 relative to the outer casing 36 to align the casing mount holes 70 with mount holes 56 of base 54 of clevis 52, as illustrated in FIGS. 8 and 9. Cam alignment tool 72 may be rotated in either direction but is illustrated to be rotated in a counter-clockwise direction as shown in FIG. 8. This causes eccentric cam portion 84 of cam alignment tool 72 to abut clevis base 54, while shank portion 76 of tool 72 remains concentric within casing mount holes 70 which cams clevis base 54, clevis 52 and the corresponding one of struts 40 relative to casing 36 to align the casing mount holes 70 with the clevis base mount boles 56. In some instances, each of the eight pairs of casing mount holes 70 and clevis base mount holes 56 shown in FIG. 4 may be aligned by rotating one of the cam alignment tools 72 positioned at locations 90 and 92. In other instances, it may be necessary to rotate both of the cam alignment tools 72 which are installed at locations 90 and 92 in Figure 4. In a preferred embodiment, the inventors have not found it necessary to utilize more than two cam alignment tools 72 to align a given strut 40 to casing 36. However, the use of additional cam alignment tools 72, which may be necessary in other applications, is intended to be within the scope of the present invention. FIG. 9 illustrates cam alignment tool 72 disposed in a casing mount hole 70 and a clevis base mount hole 56 which are aligned relative to one another. It should be understood, that the relative motion between one of the struts 40 and casing 36 caused by rotating cam alignment tool 72 may be a relative motion having components in both an axial and circumferential, or tangential, direction.

After casing mount holes 70 and clevis base mount holes 56 are aligned relative to one another clevis 52 is fastened to outer casing 36 by installing mount bolts 58 through casing mount holes 70 and mount holes 56 of base 54 of clevis 52 into nut plate 57 which is attached to an inner surface 98 of base 54 of clevis 52. In a preferred embodiment nut plates 57 are fixedly attached to clevis base 54 by conventional means (not shown). Clevis 52 is fastened to outer casing 36 by installing mount bolts 58 at the six locations which do not include one of the cam alignment tools 72. Cam alignment tools 72 are then removed and mount bolts 58 are installed at locations 90 and 92 where cam alignment tools 72 were previously installed. Figure 10 illustrates the installed position of one of the mount bolts 58 through a casing mount hole 70 and a clevis base mount hole 56 into nut plate 57.

The previously described method steps of the present invention are repeated for the remaining ones of struts 40 in a manner which facilitates the alignment of casing 36 to the plurality of struts 40 as subsequently described. Assuming that the first one of struts 40 which is aligned is strut 40A which is shown to be at the 12 o'clock position in FIG. 11, the next strut 40 to be aligned should be 40B which is disposed at the 6 o'clock position in FIG. 11 and therefore strut 40B is diametrically opposed to the first strut 40A. Next, either strut 40C, disposed at the 3 o'clock position or strut 40D, disposed at the 9 o'clock position is aligned and then the remaining one of either 40C or strut 40D is aligned wherein struts 40C and 40D are diametrically opposed to one another and are circumferentially disposed approximately midway between struts 40A and 40B. Finally, the remaining ones of struts 40 may be aligned in any order desired. It is noted that the foregoing method of selecting subsequent ones of struts 40 to be aligned relative to the first strut 40A to be aligned, may be applied in other applications having different numbers of struts either directly, applied generally, or applied in pan, depending upon the number of struts. For instance, if the number of struts is even but not divisible by four such that no struts exist at the 3 o'clock and 9 o'clock positions, then the previously described method steps of the present invention are repeated for the remaining struts 40 in any order after struts 40A and 40B have been aligned. It is further noted that the method of the present invention may be applied for an odd number of struts when no strut is diametrically opposed to strut 40A. In this event the previously described method steps of the present invention are repeated for the remaining ones of struts 40 in any order after strut 40A has been aligned. However, for an odd number of struts 40, after strut 40A has been aligned the remaining ones of struts 40 are preferably aligned, by repeating the previously described method steps of the present invention, in a predetermined pattern that approximates the foregoing pattern established by aligning strut 40B, either strut 40C or 40D, the remaining one of strut 40C or 40D, and the remaining struts 40 in any order.

While the foregoing description has set forth the preferred embodiments of the present invention in particular detail, it must be understood that numerous modifications, substitutions and changes can be undertaken without departing from the true spirit and scope of the present invention as defined by the ensuing claims. The protection desired to be secured by Letters Patent of the United States for this invention is defined by the subject matter of the following claims.

What is claimed is:

1. A method of assembling a turbine frame assembly comprising:

a) disposing an outer casing in a generally concentric relationship with an annular inner hub and a plurality of circumferentially spaced apart and radially extending struts attached to said hub;

b) inserting a least one cam alignment tool through one of a plurality of mount holes in said outer casing and into a corresponding one of a plurality of mount holes in a base of a clevis attached to an outer end of a first one of said struts;

c) rotating said cam alignment tool to cam said first one of said struts relative to said casing to align said plurality of casing mount holes with said plurality of clevis base mount holes;

d) fastening said clevis base to said outer casing; and e) removing said cam alignment tool.

2. A method as recited in claim 1, wherein:

a) said step of inserting comprises the steps of:

i) disposing a pair of cam alignment tools in diametrically opposed ones of said casing mount holes and said clevis base mount holes;

ii) positioning a shank portion of each of said tools in one of said diametrically opposed casing mount holes; and iii) locating a cam portion of each of said tools in one of said diametrically opposed clevis base mount holes;

b) said step of rotating is applied to at least one of said cam alignment tools; and c) said step of removing is applied to said pair of said cam alignment tools.

3. A method as recited in claim 1, wherein said step of fastening comprises the step of installing mount bolts through said casing mount holes and said clevis base mount holes which do not contain said cam alignment tool and threading said bolts into nut plates attached to an inner surface of said base of said clevis.

4. A method as recited in claim 2, wherein the steps of paragraphs b) through e) of claim 1 and the steps of paragraphs a) through c) of claim 2 are repeated with respect to a second one of said struts which is diametrically opposed from said first one of said struts.

5. A method as recited in claim 4, wherein the steps of paragraphs b) through e) of claim 1 and the steps of paragraphs a) through c) of claim 2 are repeated with respect to:

a) a third one of said struts which is circumferentially disposed approximately midway between said first and second ones of said struts; and b) a fourth one of said struts which is diametrically opposed to said third one of said struts.

6. A method as recited in claim 5, wherein the steps of paragraphs b) through e) of claim 1 and the steps of paragraphs a) through c) of claim 2 are repeated with respect to the remaining ones of said plurality of struts.

7. A method as recited in claim 4, wherein the steps of paragraphs b) through e) of claim 1 and the steps of paragraphs a) through c) of claim 2 are repeated with respect to the remaining ones of said plurality of struts.

8. A method as recited in claim 2, wherein the steps of paragraphs b) through e) of claim 1 and the steps of paragraphs a) through c) of claim 2 are repeated with respect to the remaining ones of said plurality of struts.

* * * * *